(12) United States Patent
Samuelson et al.

(10) Patent No.: US 8,015,943 B1
(45) Date of Patent: Sep. 13, 2011

(54) TRAVEL BOWL ASSEMBLY FOR PEOPLE

(75) Inventors: Loren J. Samuelson, Brighton, CO (US); Nancy J. Cribb, Delray Beach, FL (US)

(73) Assignee: L J S Sales, LLC, Brighton, CO (US)

( * ) Notice: Subject to any disclaimer, the term of this patent is extended or adjusted under 35 U.S.C. 154(b) by 281 days.

(21) Appl. No.: 12/263,549

(22) Filed: Nov. 3, 2008

Related U.S. Application Data

(63) Continuation-in-part of application No. 12/201,207, filed on Aug. 29, 2008, now Pat. No. 7,634,973, which is a continuation-in-part of application No. 11/588,541, filed on Oct. 27, 2006, now Pat. No. 7,527,017.

(51) Int. Cl.
*A01K 5/00* (2006.01)
*A47K 1/08* (2006.01)

(52) U.S. Cl. ........... 119/51.5; 119/61.56; 119/61.57; 248/311.2

(58) Field of Classification Search .......... 119/51.5, 119/61.5, 61.53, 61.54, 61.56, 61.57; 248/311.2
See application file for complete search history.

(56) References Cited

U.S. PATENT DOCUMENTS

| | | | |
|---|---|---|---|
| 3,205,861 A | 9/1965 | Moore | |
| 3,749,063 A | 7/1973 | Buffum | |
| 4,192,256 A | 3/1980 | Clugston | |
| 4,436,056 A | 3/1984 | MacLeod | |
| 5,105,769 A | 4/1992 | Smith et al. | |
| 5,209,184 A | 5/1993 | Sharkan et al. | |
| 5,488,927 A | 2/1996 | Lorenzana et al. | |
| 5,752,464 A | 5/1998 | King et al. | |
| 5,809,935 A | 9/1998 | Kolterman et al. | |
| 5,881,670 A | 3/1999 | Pelsor | |
| 5,954,195 A * | 9/1999 | Krueger et al. | 206/217 |
| 5,960,741 A | 10/1999 | Ballen et al. | |
| 6,082,301 A | 7/2000 | Kramer | |
| 6,101,974 A | 8/2000 | Frolich | |
| 6,109,580 A * | 8/2000 | Stern et al. | 248/311.2 |
| 6,113,049 A * | 9/2000 | Miljanich | 248/311.2 |
| D456,761 S * | 5/2002 | Hoy | D12/419 |
| 6,533,233 B2 * | 3/2003 | Thomas | 248/311.2 |
| 6,644,241 B2 | 11/2003 | Brown | |
| 6,732,990 B2 * | 5/2004 | Hudson | 248/311.2 |
| 6,971,331 B1 | 12/2005 | Rohrer | |
| 7,387,082 B1 * | 6/2008 | Fried | 119/61.5 |
| 7,422,184 B2 * | 9/2008 | Carnevali | 248/278.1 |
| 7,611,114 B1 * | 11/2009 | Griffin | 248/311.2 |
| 2001/0032791 A1 * | 10/2001 | Hudson | 206/217 |
| 2002/0185578 A1 * | 12/2002 | Hudson | 248/311.2 |
| 2003/0116094 A1 * | 6/2003 | Dlin | 119/61 |
| 2003/0141424 A1 * | 7/2003 | Thomas | 248/311.2 |
| 2004/0086112 A1 * | 5/2004 | Hilger et al. | 379/455 |
| 2004/0213405 A1 * | 10/2004 | Wilcox | 379/455 |
| 2006/0214075 A1 * | 9/2006 | Cassettari et al. | 248/311.2 |
| 2008/0078773 A1 * | 4/2008 | Cassese et al. | 220/737 |

* cited by examiner

*Primary Examiner* — Yvonne R. Abbott
(74) *Attorney, Agent, or Firm* — A Law Firm, P.C.

(57) ABSTRACT

A travel bowl assembly for traveling in a vehicle including a bowl member divided into a snack section and a cup holder section. A cup holder, cup holder insert extends downward from a bottom of the bowl member. The cup holder insert can be integrated or removably attached to the bowl. A pliant adapter can be integrated or removably attached to the cup holder insert. The pliant adapter utilizes flexible winglets for compensating between dimensional differences between the cup holder insert and a receiving cup holder. The pliant adapter is formed having a tapered sleeve for sliding the adapter onto a tapered sidewall of the cup holder insert. A lid can be provided, sealing the snack section of the bowl.

15 Claims, 13 Drawing Sheets

TRAVEL BOWL ASSEMBLY FOR PEOPLE

CROSS-REFERENCE TO RELATED APPLICATION

This Non-Provisional Utility application is a Continuation-In-Part of, and claims benefit of, U.S. Non-Provisional patent application Ser. No. 12/201,207, filed on Aug. 29, 2008, which claims benefit of co-pending U.S. Non-Provisional patent application Ser. No. 11/588,541, filed on Oct. 27, 2006, all of which are incorporated herein in its entirety.

FIELD OF THE INVENTION

The present invention relates to travel accessories, and more particularly, to a travel bowl, including a food container and drink holder carried by a removable cup holder insert, for adaptation to a vehicle.

BACKGROUND OF THE INVENTION

Many people have a desire to eat snacks and drink while traveling in a vehicle. It is considered difficult and distracting to snack and drink while driving. Passengers prefer to have a location to hold their snacks and drinks while traveling to avoid leaving crumbs and other undesirable residue in the vehicle. Drink holders are considered a standard feature in modern vehicles, while food storage compartments are lacking.

Snacks are normally stored in the original packaging and positioned in non-optimal places, such as against the seat door pockets, between the seat and the center console, and the like, in order to avoid being spilled. Further, snacks such as fast foods (hamburgers, French fries, and the like) are typically not conducive to the same type of storage or packaging as general consumer grocery products.

Accordingly, there remains in the art a need for a travel bowl for holding and storing snacks and drinks in a vehicle where the holder is inexpensive, lightweight, and optionally includes a seal-able cover for preventing snacks from becoming stale. It is desirable for the travel bowl to be securely stabilized within a vehicle when the vehicle is in motion.

SUMMARY OF THE INVENTION

The present invention overcomes the deficiencies of the known art and the problems that remain unsolved by providing a travel bowl assembly for use in a vehicle where the travel bowl assembly is portable, gives rise to manufacturing economy, and is easy to maintain and use. Moreover, the overall construction of the travel bowl assembly provides a removable cover for sealing a snack portion of the bowl while allowing the user to simultaneously secure a drink within the apparatus.

In accordance with one embodiment of the present invention, there is provided a travel bowl assembly comprising a container comprising a base and sidewall defining a container receptacle for holding food and/or fluids, the receptacle having an oval shaped bowl including a vertical wall and an oval shaped base wall. The travel bowl assembly further includes a lid that is removably attached to a portion of the oval shaped bowl providing a seal for maintaining food within the bowl receptacle.

Advantageously, the travel bowl includes a cup holder insert in a shape and size that dimensionally corresponds to a shape and size of a recess of a cup holder in a console of a vehicle such that the cup holder insert is securely retained within the recess of the vehicle's cup holder. The cup holder insert, and oval shaped bowl are dimensionally configured to provide a selected storage capacity, and can be integrally molded as one piece or a plurality of interconnecting components. Alternatively, the bowl can be provided in any reasonable shape conducive to the application of the present invention.

In one aspect, the travel bowl member includes a dividing wall disposed within the oval shaped bowl forming a food storage compartment and a drink holder portion.

A bowl lid is provided having a peripheral shape conforming to the food compartment portion of the travel bowl, the lid being removably attached to the shaped bowl by any one of a snap-on feature, a living hinge, a magnet, a clip, a rotating post, a hook and loop, sliding rails, threads, or pressure detents.

In accordance with an alternative embodiment of the present invention, there is provided a travel bowl assembly comprising a cup holder insert including a container receptacle for holding snacks, with an upper portion having threads. The travel bowl assembly further includes a threaded recess (a coupling interface) formed within the base of the bowl for detachably receiving the upper portion of the cup holder insert; thereby sealing snacks within a receptacle formed within the cup holder insert. The coupling interface can be provided within the base of the bowl or extending there from. A leveling feature can be provided extending from the base of the bowl, such that the leveling feature compensates for the extending coupling interface thus supporting the bowl ensuring it remains level.

Preferably, the cup holder insert includes a shape and size that dimensionally corresponds to a shape and size of a recess of a cup holder that is included in any one of a console of a vehicle including a boat, truck, van, transport, airplane, camper, RV, bus, train, ATV, or table, chair, or any other mode or device that includes a cup holder for securely holding a cup therein. The cup holder insert can include a plaint member for adapting the shape and size of the cup holder insert to the shape and size of a vehicle cup holder. The pliant member can be assembled to or removably attached to the cup holder insert. The pliant member can consist of a series of winglets projecting radially from the exterior wall of the pliant member.

In yet another aspect, the cup holder insert and the bowl are either integrally molded as one piece providing the cup holder insert receptacle to be in fluid communication with the bowl receptacle, or the cup holder insert is separately attached to the bowl having a means for detachably receiving formed therein for releasably attaching the cup holder insert to the bowl. The means for detachably engaging may include any one of threads, a bayonet connection, a snap-on feature, a slide means, magnets, pressure detents and the like.

Another aspect of the present invention provides an adapting sleeve, which compensates for a variety of cup holder designs and dimensions, via a plurality of flexible adapter winglets. The winglets can extend from a tubular sleeve having the dimensions consistent with the mating dimensions of the cup holder insert. The cup holder insert can be tapered (or funnel shaped) providing assistance in mating the tubular sleeve to the cup holder insert.

Regarding the embodiments described herein, as well as those covered by the claims, the travel bowl assembly is loaded with food and/or fluid and a lid is removably attached to the travel bowl. The travel bowl assembly is securely inserted within the recess of the cup holder of a vehicle console allowing the oval shaped bowl to extend partially between two front seats of a vehicle. The lid may be opaque or transparent for allowing a user to view the contents stored within the travel bowl. Further, the lid may include an extending grasp for assisting a user in removing the lid from the travel bowl. The cup holder insert, travel bowl and lid may having components fabricated utilizing glass, ceramic, metal, tin, a rigid or resilient material, a light-weight synthetic material or a polymeric material including plastic, rubber, urethane or neoprene material, or any combination thereof.

DETAILED DESCRIPTION OF THE PREFERRED EMBODIMENTS

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention.

Figure 1:
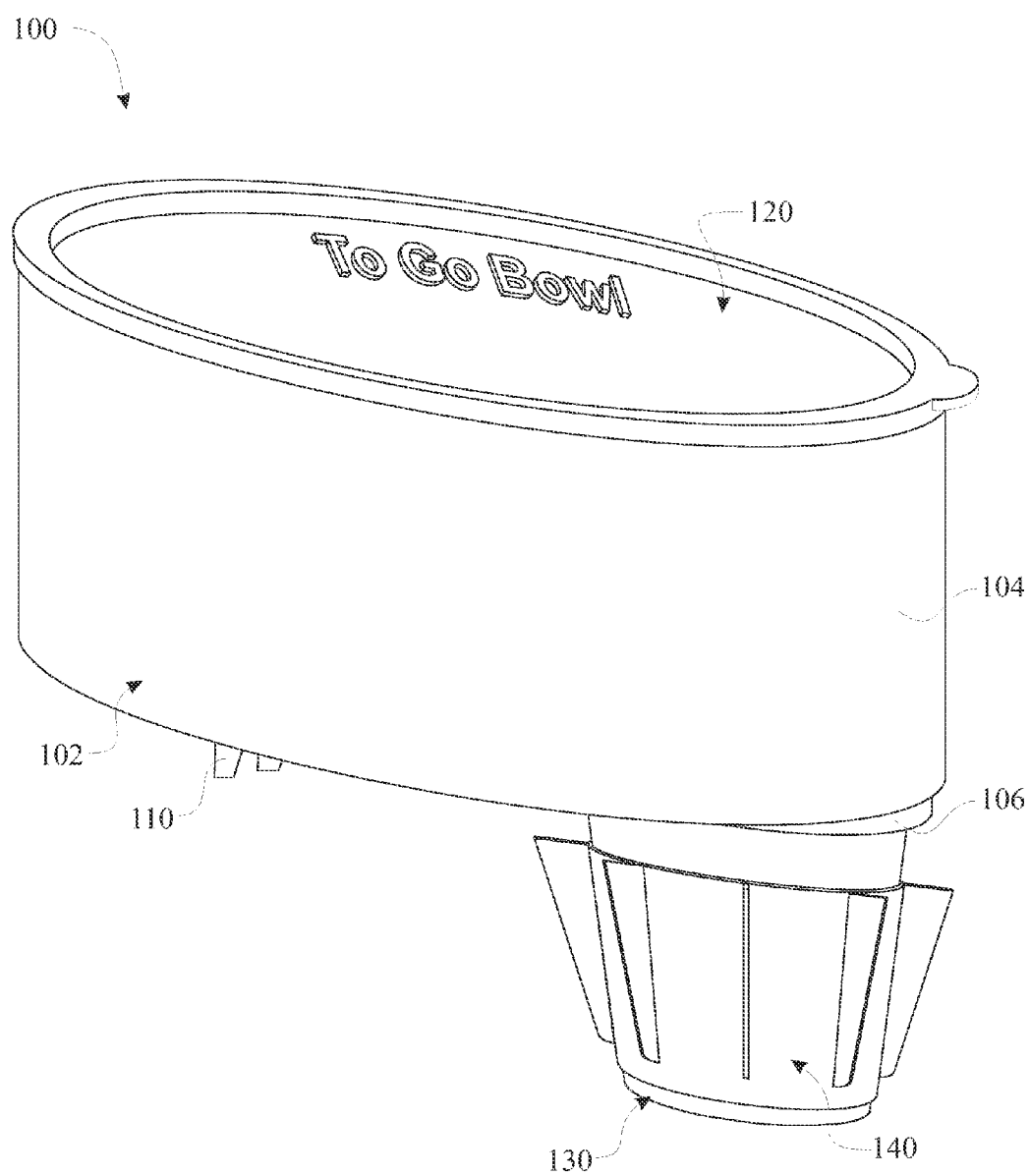
FIG. 1 is a perspective view of an exemplary embodiment of a travel bowl assembly, according to the present invention.
Figure 2:
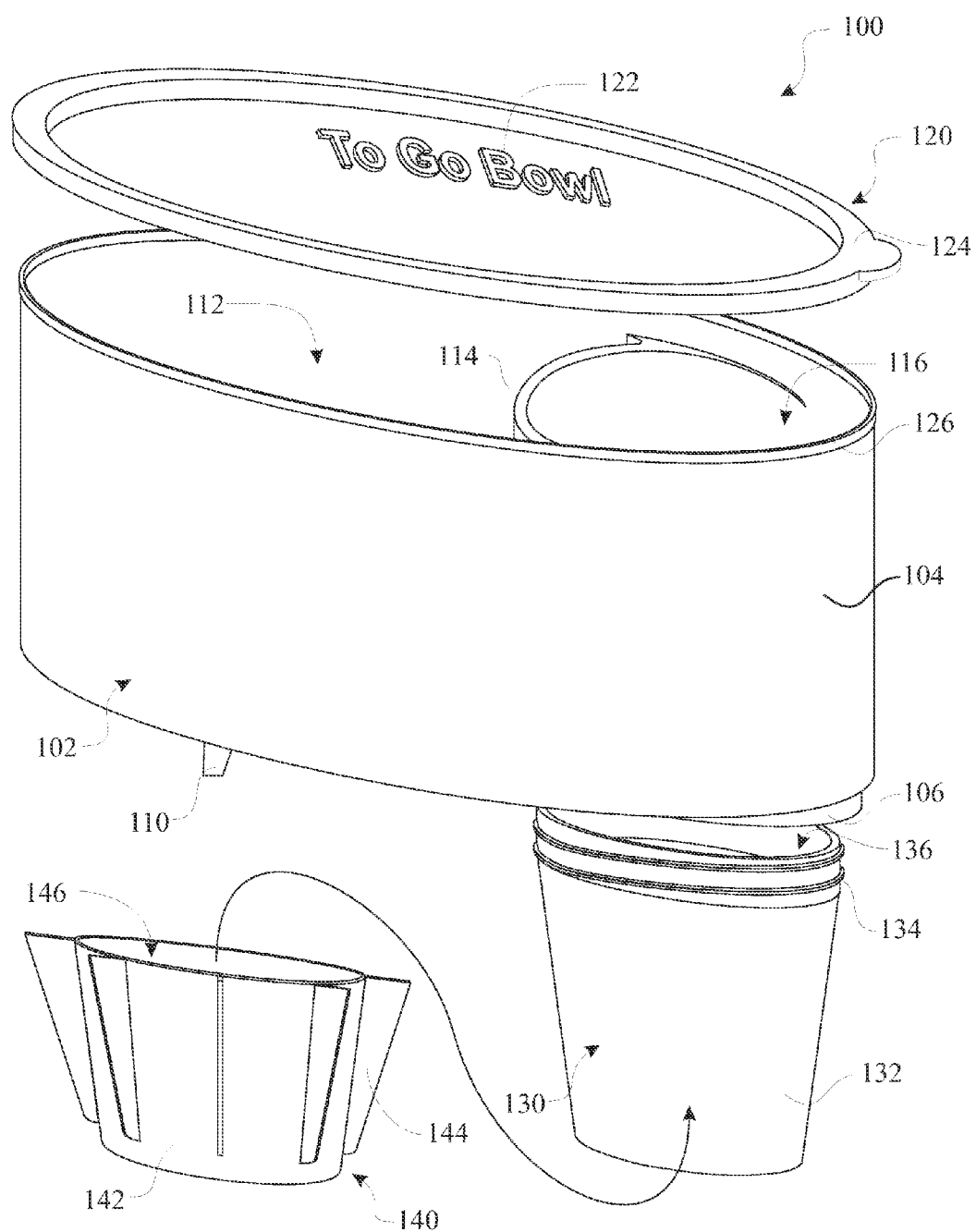
FIG. 2 is an exploded assembly view of the exemplary travel bowl assembly originally introduced in FIG. 1.
Figure 3:
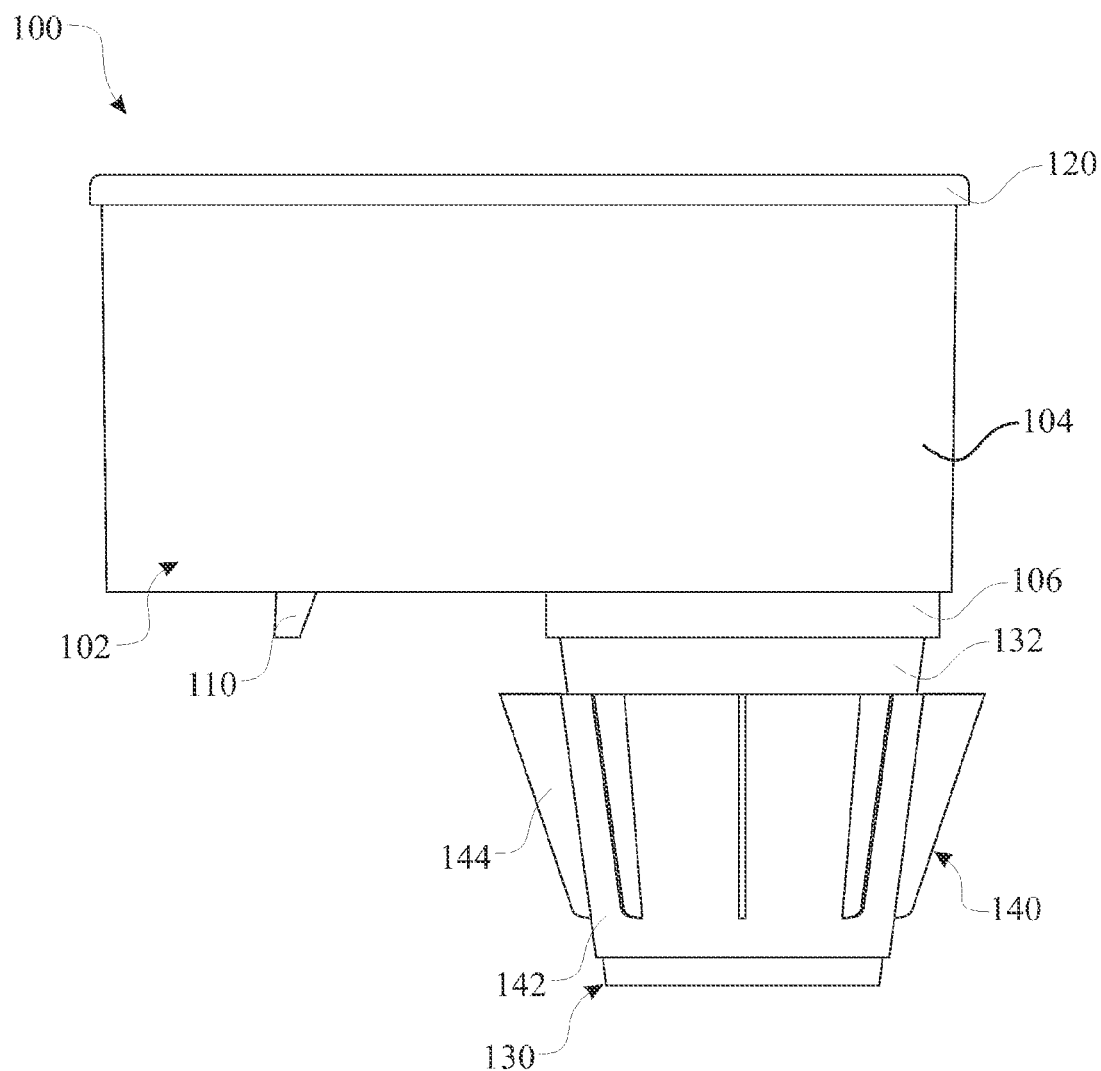
FIG. 3 is a side elevation view of the exemplary travel bowl assembly originally introduced in FIG. 1.
Figure 4:
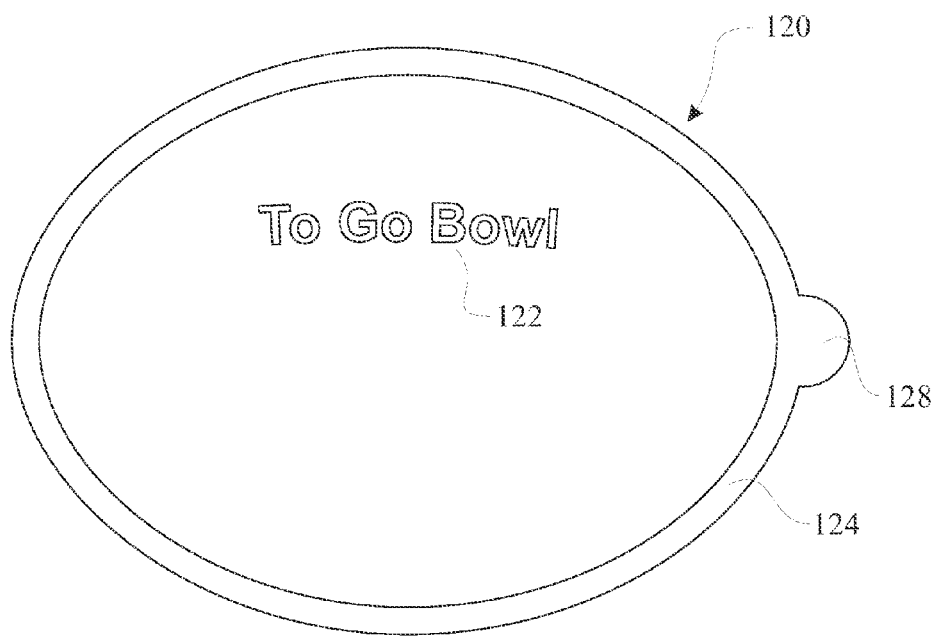
FIG. 4 is a top planar view of the exemplary travel bowl assembly originally introduced in FIG. 1.

Referring now to the drawings wherein like elements are represented by like numerals throughout, there is shown in FIG. 1 a perspective view of a travel bowl assembly 100, according to one embodiment of the present invention. Additional details of the travel bowl assembly 100 and the individual components are provided in FIGS. 2 through 14 presented herein. The travel bowl assembly 100 includes a bowl 102, a cover 120, and a cup holder insert 130. The bowl 102 is defined having a bowl body 104 comprising a snack containing section 112 and a drink holder section 116 separated via a bowl sectioning wall 114. A mount receptacle 106 is provided on a lower face of a base portion of the bowl body 104 and can extend from the bottom (as shown) or project upwards into the snack containing section 112 or drink holder section 116 regions. A leveling feature 110 can be included providing a planar supporting surface should the design of the mount receptacle 106 extend downward from the base of the bowl body 104. The leveling feature 110 can be of any reasonable form factor, such as two projecting legs as illustrated, a projecting ridge or wall, and the like, working in conjunction with the mount receptacle 106 for supporting the bowl 102 when placed upon a resting surface 150. The cover 120 provides a seal to retain freshness of snacks disposed within the snack containing section 112 of the bowl 102. A snap latch ring 126 can be formed about an upper edge of the bowl body 104 providing a means for sealing a cover securing interface 124 of the cover 120 to the bowl body 104.

The travel bowl assembly 100 is secured in the vehicle via the cup holder insert 130. The cup holder insert 130 is formed having a shape and size substantially similar to a shape and size of a common vehicle cup holder. The cup holder insert 130 is provided, preferably being removably attached to the bowl body 104 via a connection interface disposed between an upper edge of the cup holder insert 130 and the mount receptacle 106. The cup holder insert 130 is defined via a mount container body 132 having a horizontal base and a sidewall extending upwards from the edge of the horizontal base, forming an object storage receptacle 136. The object storage receptacle 136 provides a means for storing snacks 119 (FIG. 16) or other small items. Mount securing threads 134 are provided along the upper edge of the cup holder insert 130, wherein the mount securing threads 134 provide a mating connection interface for removably attaching the cup holder insert 130 to the mount receptacle 106. Alternately, the mount securing threads 134 can be of any known detachably engaging form factor including any one of threads (as shown), a bayonet connection, a snap-on feature, a slide means, magnets, pressure detents, and the like.

A cup holder adapter sleeve 140 can be provided to aid in conforming and securing the cup holder insert 130 to the vehicle cup holder. The cup holder adapter sleeve 140 includes a adapter body 142 having a shape and size similar to the exterior of the mount container body 132 and a plurality of adapter winglet panels 144 extending there from. The adapter winglet panels 144 are preferably thin, pliant ribs extending radially from the exterior surface of the adapter body 142, providing an adaptive means for ensuring a reliable holding interface between the cup holder insert 130 and the respective cup holder. The preferred shape of the adapter sleeve opening 146 of the adapter body 142 is tubular and tapering having a larger upper opening diameter with a smaller lower opening diameter, ensuring a reliable and repeatable mating between the mount container body 132 and the adapter body 142. The adapter winglet panels 144 are provided having a thin wall projecting radially from the adapter body 142 with a tapered distal edge. The adapter winglet panels 144 have an initial width at the lower edge, with a span from the central interface edge increasing in the radial direction as the adapter winglet panels 144 as the distal edge progresses towards the upper edge. The cup holder adapter sleeve 140 is fabricated of a pliant material such as nylon.

Figure 5:
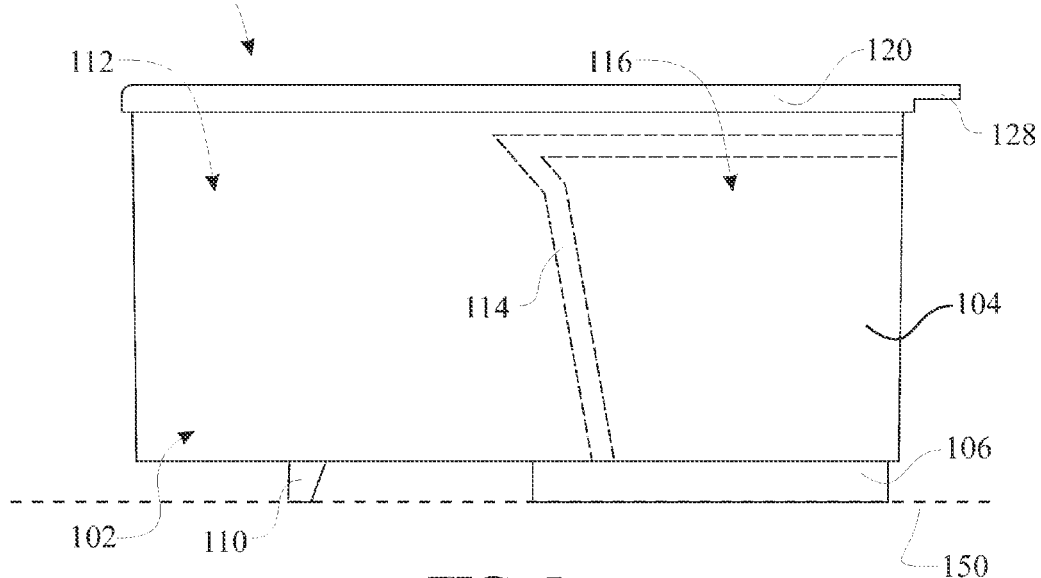
FIG. 5 is a side elevation view of the travel bowl assembly introducing a bowl interior compartment sectioning structure.
Figure 6:
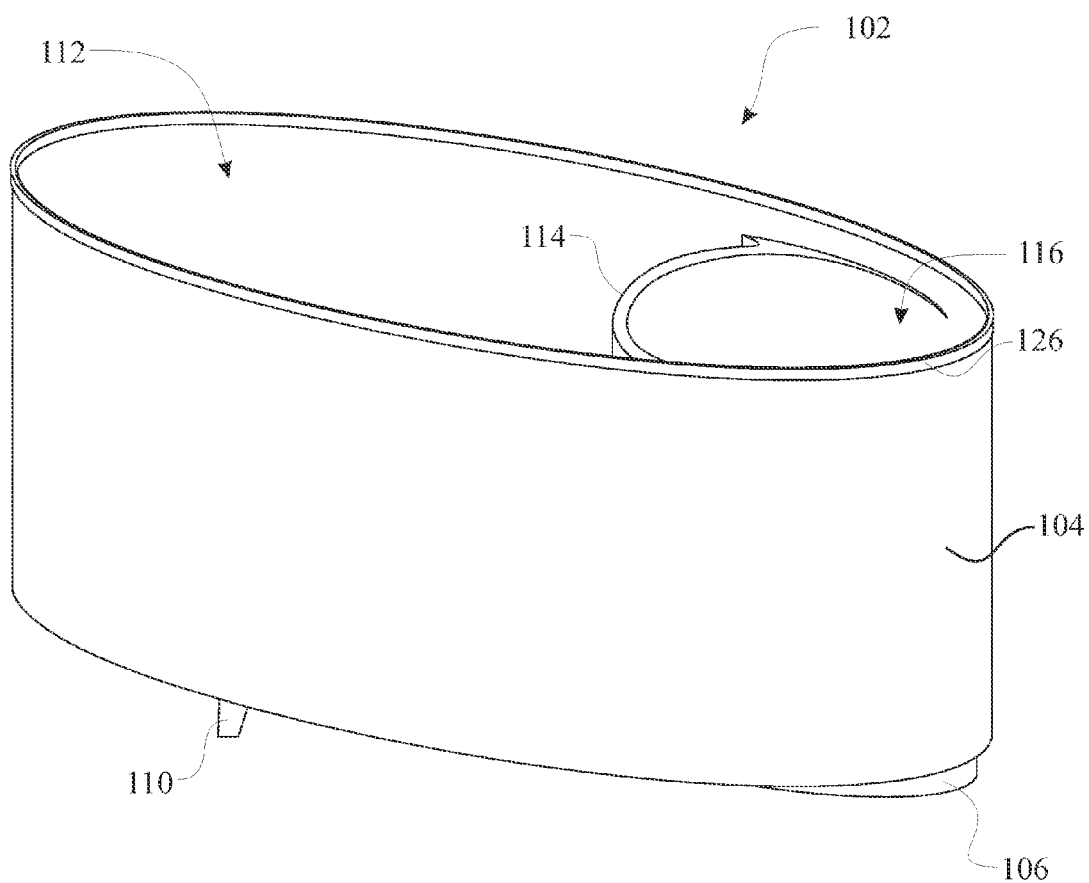
FIG. 6 is an isometric view of a bowl member of the travel bowl assembly.
Figure 7:
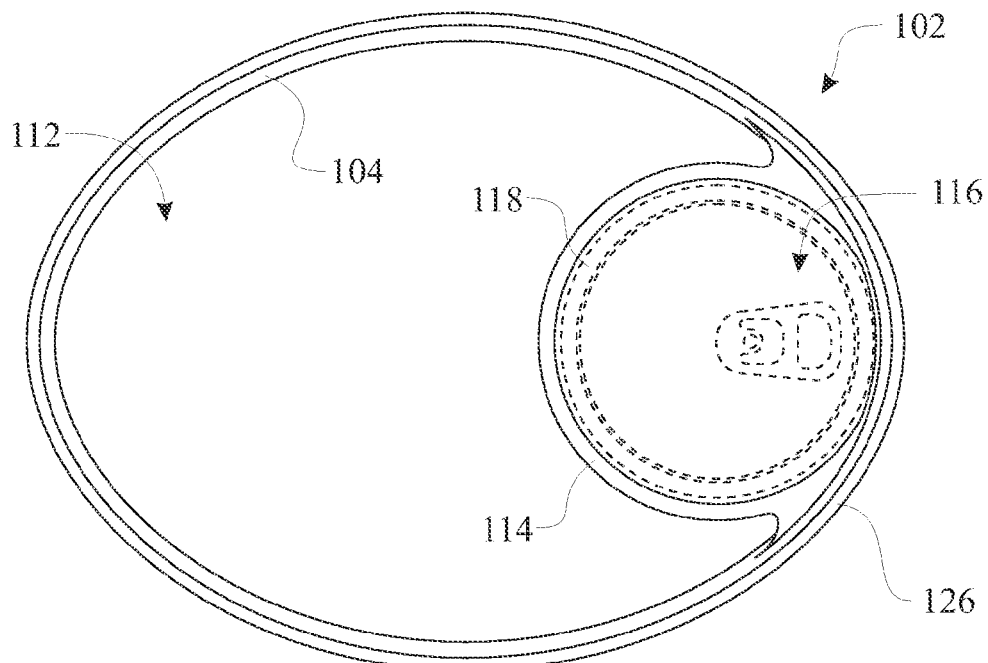
FIG. 7 is a top view of the bowl member of the travel bowl assembly.
Figure 8:
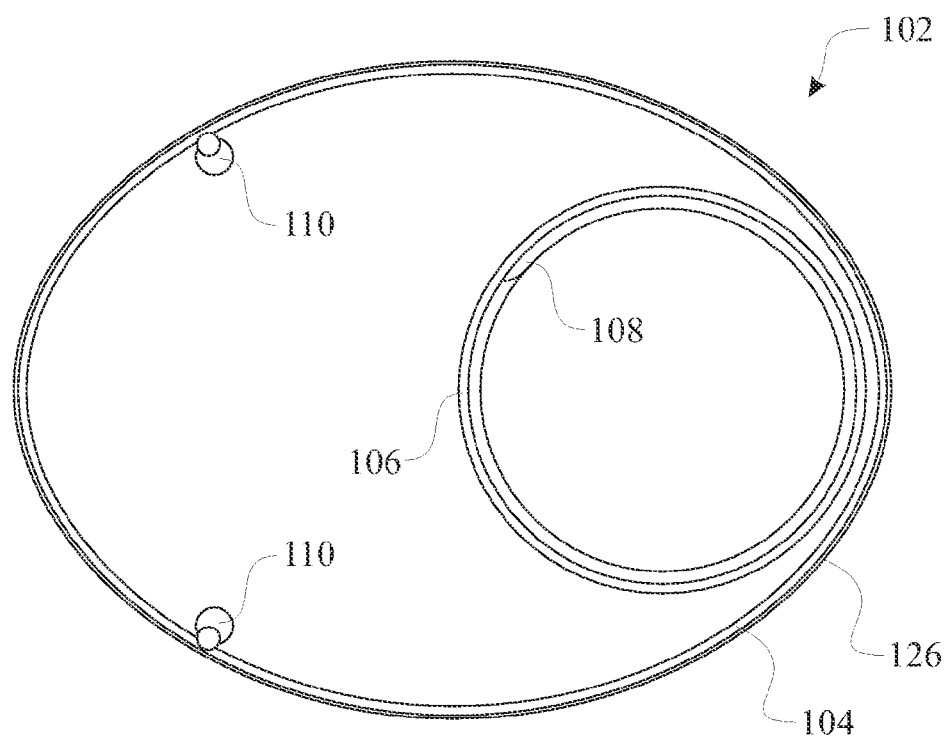
FIG. 8 is a bottom view of the bowl member of the travel bowl assembly.

The bowl 102 is presented in FIGS. 6 through 8. The bowl 102 is defined having a bowl body 104, divided into a snack containing section 112 and a drink holder section 116 via the incorporation of a bowl sectioning wall 114 as illustrated in FIGS. 5 through 7. The bowl sectioning wall 114 extends upwards from the base of the bowl body 104, formed in an arc spanning between two sections of the bowl's vertical wall. The bowl sectioning wall 114 divides the interior of the bowl 102 into two sections: the snack containing section 112 and the drink holder section 116. The bowl sectioning wall 114 is formed having a size and shape commonly utilized for a cup holder for containing items such as a drink 118. The exemplary embodiment presents a mount receptacle 106, having a mount receptacle coupling threads 108, disposed on a bottom surface of the bowl body 104. A pair of leveling features 110 projects from the bottom of the bowl body 104, projecting the same distance as the mount receptacle 106, thus providing a stable support of the travel bowl assembly 100 when the cup holder insert 130 is removed and the travel bowl assembly 100 is placed on a planar surface.

Figure 9:
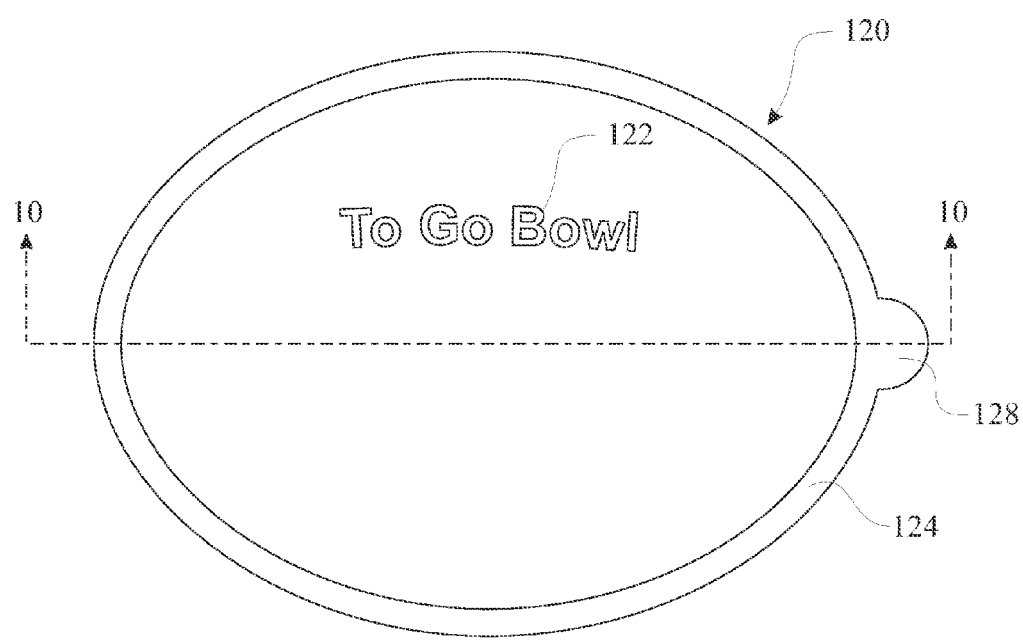
FIG. 9 is a top view of a first exemplary lid member of the travel bowl assembly.
Figure 10:
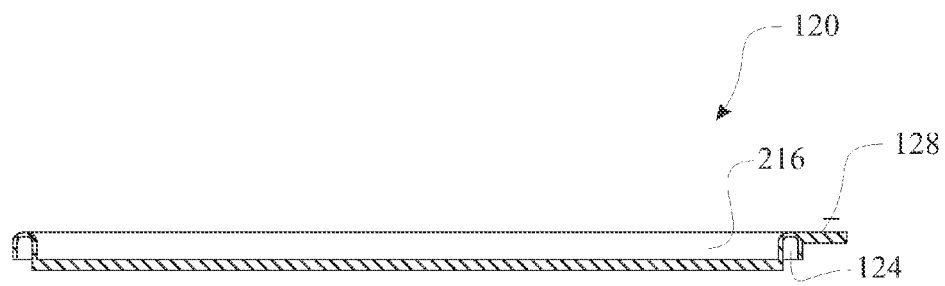
FIG. 10 is a side sectional view of the first exemplary lid member of the travel bowl assembly, the section taken along section 10—10 of FIG. 9.

The cover 120 can be provided in a variety of form factors with one exemplary embodiment being presented in FIGS. 9 and 10. The cover 120 includes features such as a cover securing interface 124 for removably securing the cover 120 to a snap latch ring 126 of the bowl 102 and a extending grasp 128 for assisting the user in removing the cover 120 from the bowl 102. An optional identification 122 can be disposed upon the lid surface. A first form factor presented seals the entire periphery of the entire upper edge of the bowl 102. Other geometries will be presented later herein.

Figure 11:
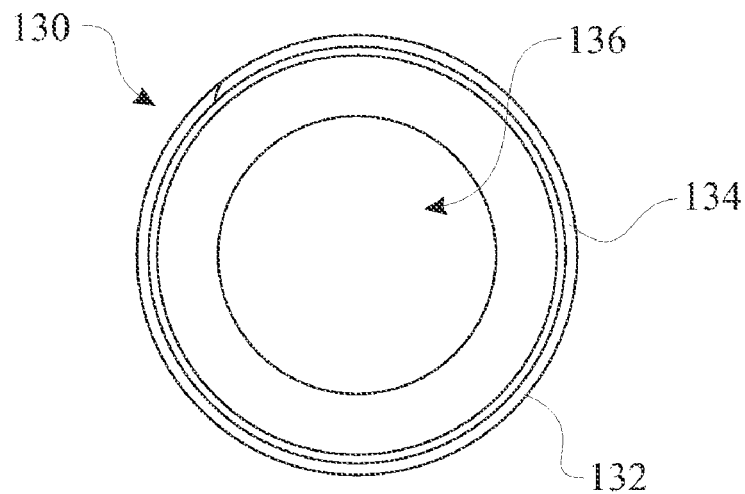
FIG. 11 is a top planar view of a cup holder insert member of the travel bowl assembly.
Figure 12:
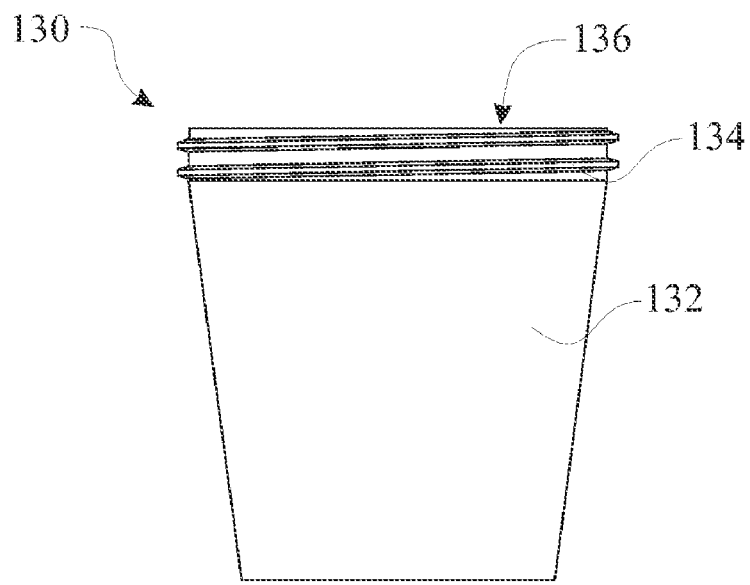
FIG. 12 is a side elevation view of the cup holder insert member of the travel bowl assembly.
Figure 13:
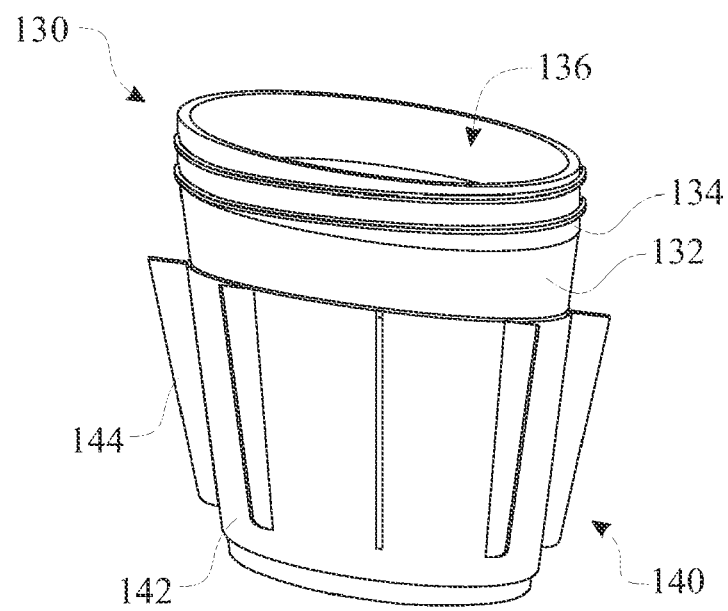
FIG. 13 is an isometric view of a pliant cup holder adapting member as assembled to the cup holder insert member of the travel bowl assembly.
Figure 14:
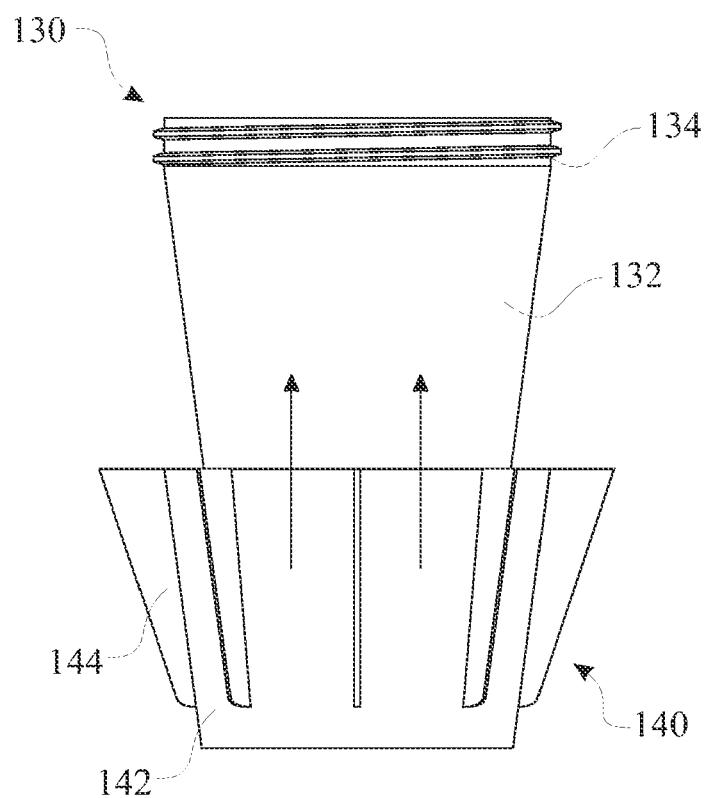
FIG. 14 is an elevation view of the pliant cup holder adapting member shown being assembled to the cup holder insert member of the travel bowl assembly.

The cup holder insert 130 is detailed in FIGS. 11 and 12, with the cup holder adapter sleeve 140 being assembled in FIGS. 13 and 14. The cup holder insert 130 is formed having a mount container body 132 extending from a peripheral edge of a bottom forming an object storage receptacle 136. A mount securing threads 134 is formed along the upper edge of the mount container body 132. Although the mount securing threads 134 is noted as having threads, it is recognized that other releasably attaching interfaces can be utilized for releasably coupling the cup holder insert 130 to the bowl 102. It is preferred that the mount container body 132 is tapered, having a smaller diameter along the lower portion of the cup holder insert 130. The diameter of the mount container body 132 would be compatible with generic cup holders. A cup holder adapter sleeve 140 can be included, being slideably assembled to the cup holder insert 130. The cup holder adapter sleeve 140 includes a plurality of adapter winglet panels 144 projecting radially from an adapter body 142. The adapter body 142 is shaped to slideably assemble to the cup holder insert 130, preferably utilizing a tapered shape to help ensure a reliable interface. The cup holder adapter sleeve 140 would be fabricated of a nylon or nylon-like material.

Figure 15:
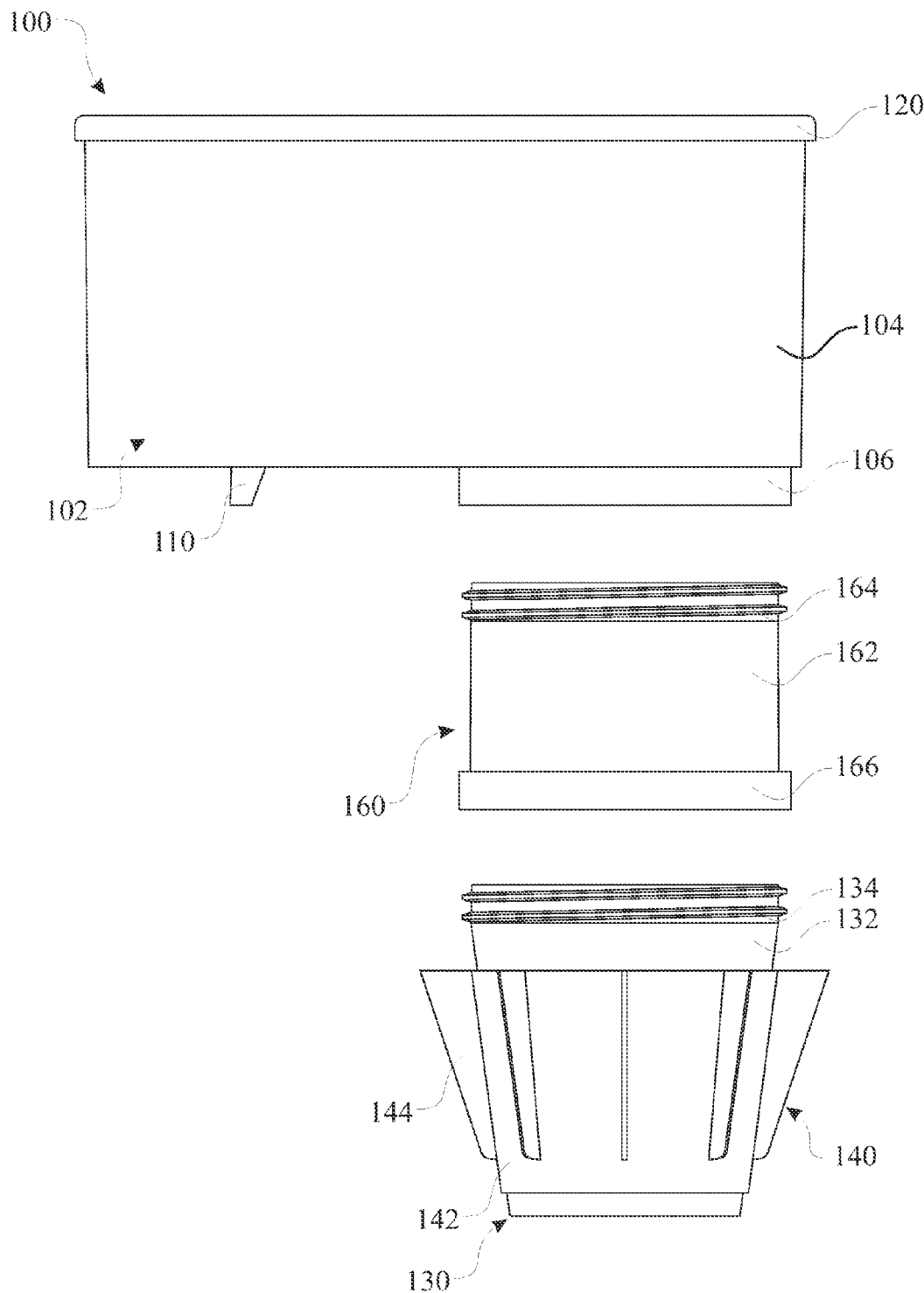
FIG. 15 is a side elevation assembly view of the cup holder insert member, a cup holder insert extension member, and the bowl member.

For instances where the bowl 102 needs to be raised from the cup holder insert 130, a mount extension 160 can be assembled between the cup holder insert 130 and the bowl 102, as illustrated in FIG. 15. The mount extension 160 is fabricated having an extension body 162, with an extension male threading 164 formed along an upper edge and an extension female threading 166 formed along a lower edge. The extension male threading 164 would be removably attached to the mount receptacle 106 and the extension female threading 166 being removably attached to the mount securing threads 134. The extension body 162 could be hollow, increasing the available storage volume of the object storage receptacle 136. The spacing can vary via having mount extension 160 with different lengths, utilizing a plurality of mount extension 160 or combination thereon.

Figure 16:
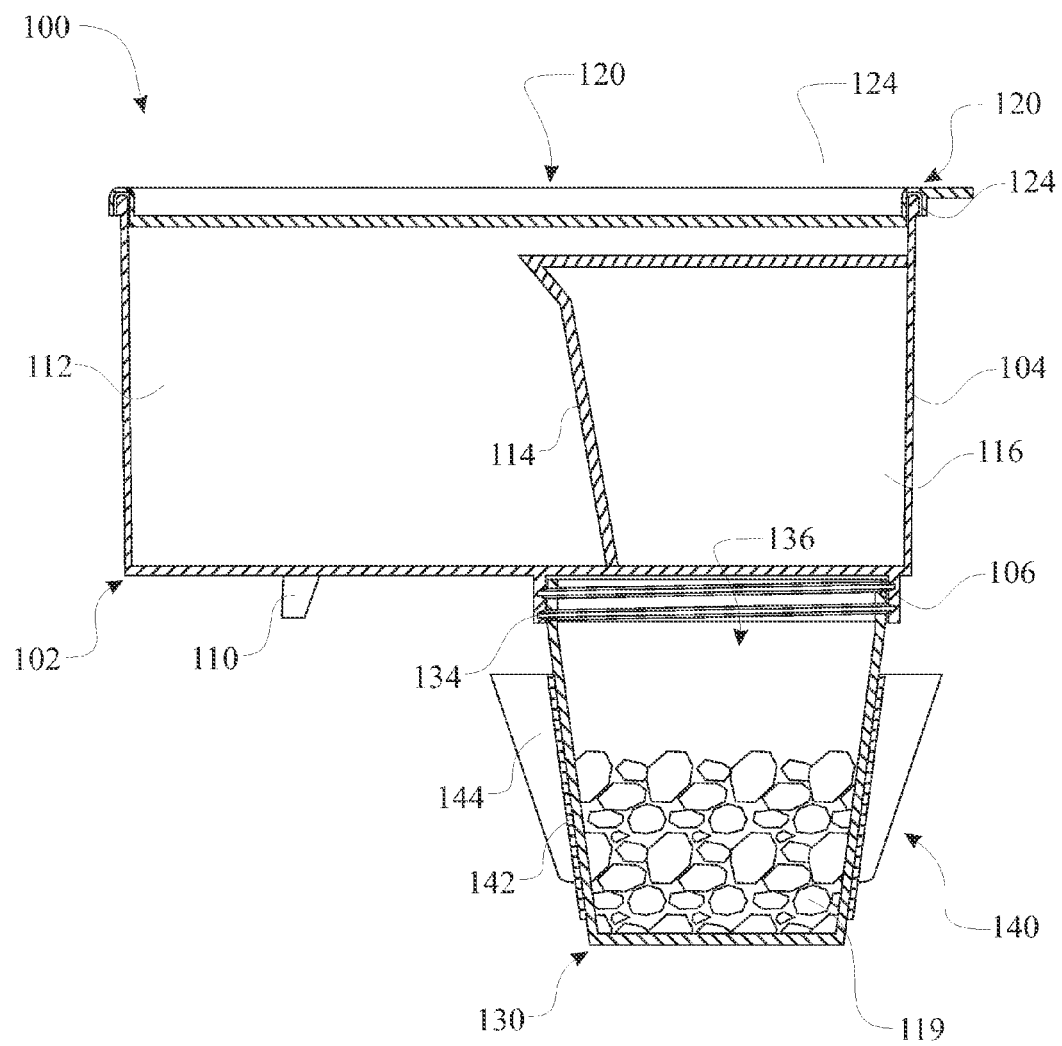
FIG. 16 is a sectional elevation view of the travel bowl assembly.

Snacks 119 can be stored in the object storage receptacle 136 as illustrated in the sectional view of FIG. 16. Alternately, snacks 119 can be stored in the snack containing section 112, being sealed via the cover 120.

Figure 17:
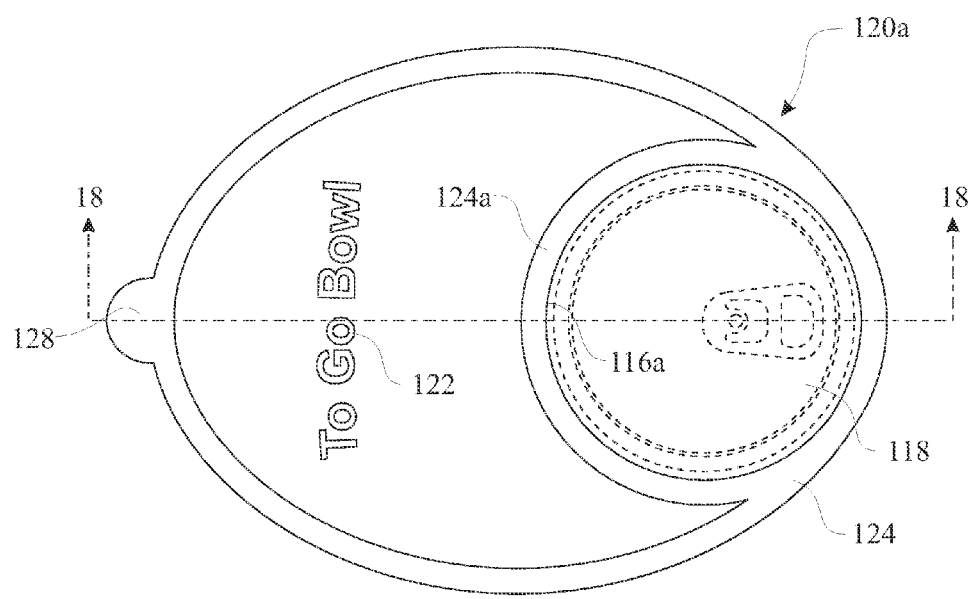
FIG. 17 is a top planar view of the exemplary lid installed on the travel bowl assembly, further illustrating the interaction of the exemplary lid and a drink.
Figure 18:
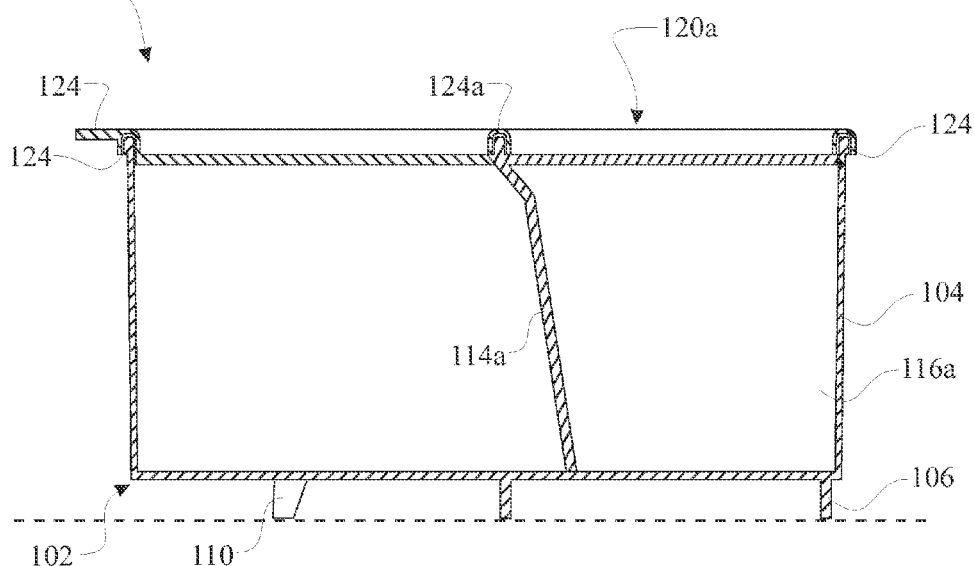
FIG. 18 is a side sectional view of the travel bowl assembly, the section taken along section 18—18 of FIG. 17.

Two (2) alternate bowl configurations are presented in FIGS. 17 through 20. The bowl sectioning wall 114a can be extended, providing an additional coupling region for securing a cover 120a to the bowl body 104 as illustrated in FIGS. 17 and 18. The cover 120a would include an opening, which provides a clearance for insertion and removal of a drink 118. By providing a cover securing interface 124a, the user can secure the cover 120a to the bowl 102 and rotate the cover 120a about the drink 118, thus giving access to snacks stored in the snack containing section 112. A small notch can be provided along the snap latch ring 126 (FIG. 2) for clearance for the rotation.

Figure 19:
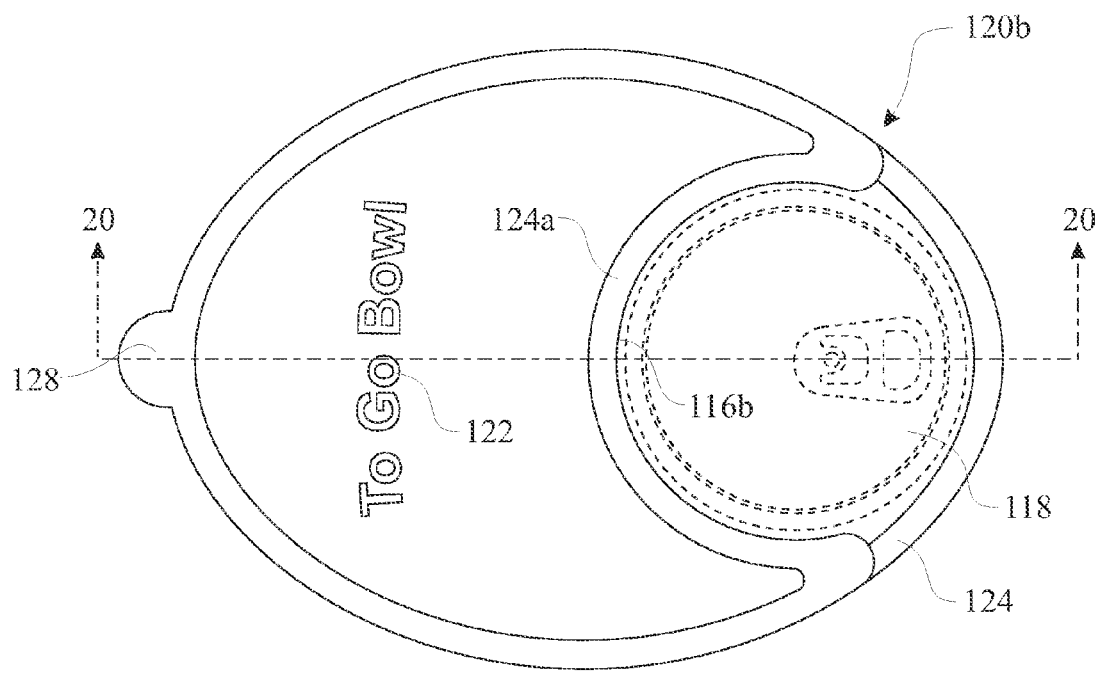
FIG. 19 is a top planar view of an alternate exemplary lid installed on an alternate embodiment of the travel bowl member, further illustrating the interaction of the alternate exemplary lid and a drink.
Figure 20:
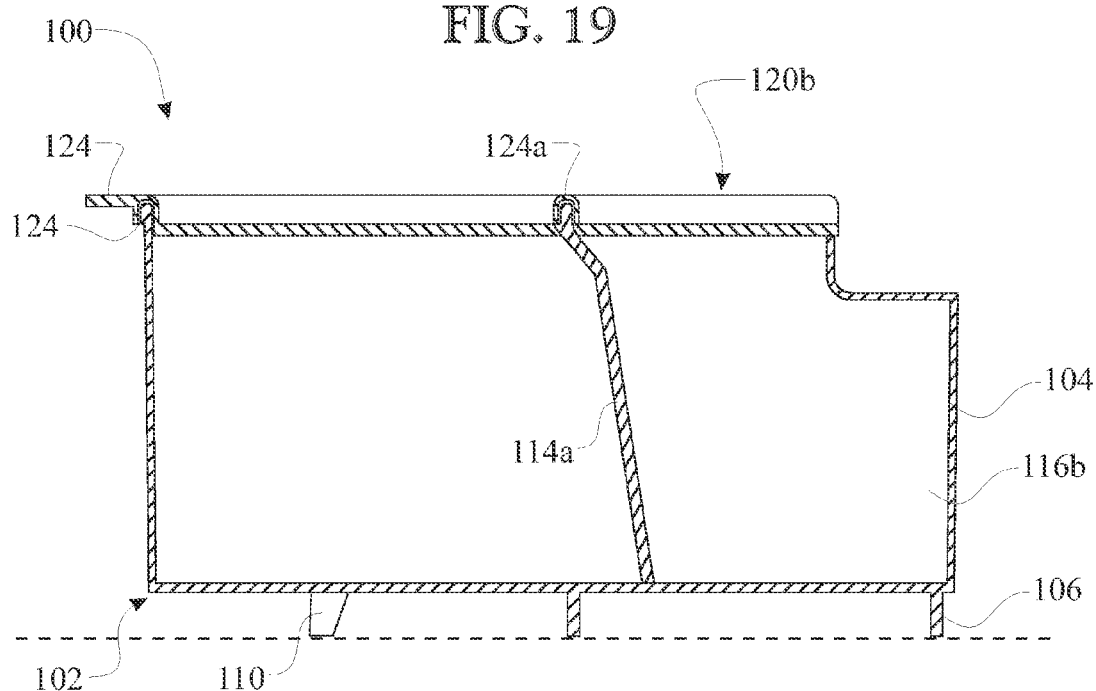
FIG. 20 is a side sectional view of the alternate travel bowl assembly embodiment, the section taken along section 20—20 of FIG. 19.

Alternately, the bowl sectioning wall 114a can be extended as previously shown and a portion of the bowl body 104 adjacent to the drink holder section 116b can be formed shorter as illustrated in FIGS. 19 and 20. The cover 120b would be formed having a crescent shape, exposing the drink holder section 116b. The lower wall section of the bowl body 104 eases access to the drink 118.

The present invention utilizes a cup holder insert 130 as the mounting interface for removably securing the travel bowl assembly 100 to a vehicle cup holder. The present invention can be adapted to other applications such as a stroller, crib, child's car seat, bicycle, and the like by providing a variation of the cup holder insert 130. The mount would have a similar interface for securing the mount to the bowl 102, while having a form factor suitable for securing the travel bowl assembly 100 to a respective object, such as a loop for securing the mount to a handlebar. The loop can have any specific features allowing the loop to tighten and release from the tubular structure. Other designs, such as a quick release camera mount design, and the like can be utilized.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:
1. A travel bowl assembly comprising:
   a bowl including a bowl base and a vertical wall projecting upwards from a perimeter of said base, said bowl comprising a sectional wall forming a snack section and a cup holder;

a mating engaging interface disposed upon a lower surface of said bowl base, wherein said mating engaging interface projects downward from said lower surface of said bowl base;

a leveling feature disposed upon and projecting downward from said lower surface of said bowl base, wherein said leveling feature and said mating engaging interface equally project downward to provide a level support for said bowl when placed onto a surface;

a cup holder insert, comprising an engaging interface disposed upon an upper portion of said cup holder insert, said engaging interface configured for releasable coupling with said mating engaging interface, said cup holder insert having a size and shape of a recess of a cup holder in a console of a vehicle;

a pliant cup holder adapter coupled to the cup holder insert; and a plurality of flexible tapered adapter winglet panels extending radially outward from said pliant cup holder adapter, wherein said plurality of flexible tapered adapter winglet panels provide a means for compensating for dimensional differences between a cup holder insert sidewall and the cup holder.

2. A travel bowl assembly as recited in claim 1, wherein the cup holder insert is removably attached to a lower portion of the bowl base.

3. A travel bowl assembly as recited in claim 1, the assembly further comprising a cover that is removably attached to the bowl.

4. A travel bowl assembly as recited in claim 1, wherein the cover is removably attached to the bowl by any one of a snap-on feature, a living hinge, a magnet, a clip, a rotating post, a hook and loop, sliding rails, threads, and pressure detents.

5. A travel bowl assembly comprising:
a bowl including a bowl base and a vertical wall projecting upwards from a perimeter of said base, said bowl comprising a sectional wall forming a snack section and a cup holder;

a cover member which is removably attached to the bowl and provides a seal for at least the snack section;

a mating engaging interface disposed upon a lower surface of said bowl base, wherein said mating engaging interface projects downward from said lower surface of said bowl base;

a leveling feature disposed upon and projecting downward from said lower surface of said bowl base, wherein said leveling feature and said mating engaging interface equally project downward to provide a level support for said bowl when placed onto a surface;

a cup holder insert, comprising an engaging interface disposed upon an upper portion of said cup holder insert, said engaging interface configured for releasable coupling with said mating engaging interface, said cup holder insert having a size and shape of a recess of a cup holder in a console of a vehicle;

a pliant cup holder adapter coupled to the cup holder insert; and a plurality of flexible tapered adapter winglet panels extending radially outward from said pliant cup holder adapter, wherein said plurality of flexible tapered adapter winglet panels provide a means for compensating for dimensional differences between a cup holder insert sidewall and the cup holder.

6. A travel bowl assembly as recited in claim 5, wherein the cover is removably attached to the bowl by any one of a snap-on feature, a living hinge, a magnet, a clip, a rotating post, a hook and loop, sliding rails, threads, and pressure detents.

7. A travel bowl assembly as recited in claim 5, wherein the cup holder insert is removably attached to a lower portion of the bowl base.

8. A travel bowl assembly comprising:
a bowl including a bowl base and a vertical wall projecting upwards from a perimeter of said base, said bowl comprising a sectional wall forming a snack section and a cup holder section;

a mating engaging interface disposed upon a lower surface of said bowl base, wherein said mating engaging interface projects downward from said lower surface of said bowl base;

a leveling feature disposed upon and projecting downward from said lower surface of said bowl base, wherein said leveling feature and said mating engaging interface equally project downward to provide a level support for said bowl when placed onto a surface;

a cup holder insert, comprising an engaging interface disposed upon an upper portion of said cup holder insert, said engaging interface configured for releasable coupling with said mating engaging interface, said cup holder insert having a size and shape of a recess of a cup holder in a console of a vehicle;

a pliant cup holder adapter coupled to the cup holder insert; and a plurality of flexible tapered adapter winglet panels extending radially outward from said pliant cup holder adapter, wherein said plurality of flexible tapered adapter winglet panels provide a means for compensating for dimensional differences between a cup holder insert sidewall and the cup holder.

9. A travel bowl assembly as recited in claim 8, wherein the cup holder insert is removably attached to a lower portion of the bowl base.

10. A travel bowl assembly as recited in claim 8, wherein the pliant cup holder adapter is removably attached to the cup holder insert.

11. A travel bowl assembly as recited in claim 10, wherein cup holder insert includes a tapered sidewall and the pliant cup holder includes a tapered sleeve having a size and shape that is similar to the cup holder insert.

12. A travel bowl assembly as recited in claim 8, wherein said plurality of flexible tapered adapter winglet panels extend radially outward from at least one of a tapered sleeve of the pliant cup holder adapter and the cup holder insert.

13. A travel bowl assembly as recited in claim 8, the assembly further comprising a cover that is removably attached to the bowl, wherein the cover provides a seal for at least the snack section.

14. A travel bowl assembly as recited in claim 13, wherein the cover is removably attached to the bowl by any one of a snap-on feature, a living hinge, a magnet, a clip, a rotating post, a hook and loop, sliding rails, threads, and pressure detents.

15. A travel bowl assembly as recited in claim 13, wherein the cover further includes a clearance allowing insertion of a drink into the bowl cup holder.

* * * * *